US009661032B2

(12) United States Patent
Nyberg et al.

(10) Patent No.: US 9,661,032 B2
(45) Date of Patent: May 23, 2017

(54) CLIENT AND A METHOD IN A CLIENT IN A COMMUNICATION NETWORK FOR PROVIDING A SERVICE

(75) Inventors: Marcus Nyberg, Hägersten (SE); Bo Burman, Upplands Väsby (SE); Anders Eriksson, Uppsala (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 594 days.

(21) Appl. No.: 13/991,740

(22) PCT Filed: Dec. 14, 2010

(86) PCT No.: PCT/EP2010/069635
§ 371 (c)(1),
(2), (4) Date: Jun. 5, 2013

(87) PCT Pub. No.: WO2012/079620
PCT Pub. Date: Jun. 21, 2012

(65) Prior Publication Data
US 2013/0290552 A1 Oct. 31, 2013

(51) Int. Cl.
*G06F 15/16* (2006.01)
*H04L 29/06* (2006.01)
*H04W 4/02* (2009.01)

(52) U.S. Cl.
CPC .......... *H04L 65/1069* (2013.01); *H04L 69/24* (2013.01); *H04W 4/023* (2013.01)

(58) Field of Classification Search
CPC . H04L 65/1069; H04L 65/1083; H04L 69/24; H04L 65/1089; H04L 65/4015
(Continued)

(56) References Cited

U.S. PATENT DOCUMENTS

2007/0078986 A1* 4/2007 Ethier ................ H04L 65/1069
709/227
2008/0279119 A1 11/2008 Stille et al.
(Continued)

FOREIGN PATENT DOCUMENTS

CN 101296233 A 10/2008
CN 101331729 A 12/2008
(Continued)

*Primary Examiner* — Kristie Shingles
(74) *Attorney, Agent, or Firm* — Patents on Demand P.A.; Brian K. Buchheit; Scott M. Garrett (57) ABSTRACT

A client and a method in a client in a communication network comprising a core network, for providing a communication service, is provided. The method comprises receiving a session setup request from an originating party, requesting a session with a destination party. The setup request comprises a capability indication associated with the originating party and a session type indication. The method further comprises determining capabilities of devices in a first communication context associated with the destination party and comparing the capabilities of the devices in the first communication context to the capability indication and to the session type indication in the received request Still further, the method comprises determining a level of correspondence between the capability indication and the session type indication, and the capabilities of devices in the first communication context, and indicating a device in the first communication context having a suitable level of correspondence to the capability indication associated with the originating party and the session type indication.

23 Claims, 9 Drawing Sheets

(58) Field of Classification Search
USPC ................................ 709/227, 228, 203, 217
See application file for complete search history.

(56) References Cited

U.S. PATENT DOCUMENTS

| | | | |
|---|---|---|---|
| 2011/0087788 A1* | 4/2011 | Maeng | H04L 12/2809 709/227 |
| 2011/0173292 A1* | 7/2011 | Patel | H04W 36/0005 709/217 |
| 2011/0267989 A1 | 11/2011 | Bouvet | |
| 2014/0032636 A1* | 1/2014 | Nelson | H04N 21/2343 709/203 |

FOREIGN PATENT DOCUMENTS

| | | | |
|---|---|---|---|
| CN | 101682617 A | 3/2010 | |
| EP | 1148688 A1 | 10/2001 | |
| EP | 1968334 A2 | 9/2008 | |
| WO | 2005027460 A1 | 3/2005 | |
| WO | 2007056824 A1 | 5/2007 | |
| WO | 2010061132 A1 | 6/2010 | |

\* cited by examiner

CLIENT AND A METHOD IN A CLIENT IN A COMMUNICATION NETWORK FOR PROVIDING A SERVICE

TECHNICAL FIELD

The invention relates generally to providing a service in a communication network. The present invention relates in particular to a client and a method in a client for providing a communication service to a party having a communication context comprising a plurality of devices.

BACKGROUND

The number of communication services that are offered to users is constantly increasing. New services are being introduced introducing different demands on resources and capabilities of the communication systems. Also, the number of different devices that can be used for communication sessions and in conjunction with different services also constantly increases. Some of today's mobile telephones are a combination of a good quality camera, a mobile telephone and a relatively powerful computer. This is just a common example of the rapid technological development of today. In this simple but illustrative example, it is not obvious of the mobile phone is a camera which is equipped with communication capabilities, a mobile telephone with a camera or a handheld computer with communication capabilities and a camera. This rapid technological development is continuously ongoing. Further, many communication services span over many different devices. The features of the very same service may differ depending on which device that is being used. As a very simple example, a voice call can be provided using GSM (Global System for Mobile communication) or 3G (Third generation). These two services are based on different technologies but must be able to interact automatically and without user intervention. A user wanting to make a telephone call with his mobile telephone need not know if the person he is calling is using GSM or 3G, it is handled by the systems.

In the future, it is assumed that even more devices will become part communication sessions, both for private and for professional purposes. It is also assumed that the future will present even more modalities that can convey wither communication information or other attributes on order to experience remote contexts.

In view of the rapid technology development, the future is likely to present a great increase in amount of communication options that users will be able to make use of. This indicates that the users will need some kind of assistance in order to select what type of device that is suitable for accepting an incoming invitation to join a communication session. A user may also need some kind of assistance in order to select what type of device that is capable of being used in the type session or communication that a remote party, or originating party, whishes to engage in.

It is expected that much more complex communication environments will be provided in the future, especially compared to today's limited set of communication modalities and communication devices.

SUMMARY

It is an object of the exemplifying embodiments of the present invention to address at least some of the problems outlined above. In particular, it is an object of the invention to provide a service to a party having a communication context comprising a plurality of devices. These objects and others may be obtained by providing a method and a client according to the independent claims attached below.

According to an aspect, a method in a client, in a communication network comprising a core network, for providing a communication service, is provided. The method comprises receiving a session setup request from an originating party, requesting a session with a destination party. The setup request comprises a capability indication associated with the originating party and a session type indication. The method further comprises determining capabilities of devices in a first communication context associated with the destination party and comparing the capabilities of the devices in the first communication context to the capability indication and to the session type indication in the received request. Still further, the method comprises determining a level of correspondence between the capability indication and the session type indication, and the capabilities of devices in the first communication context, and indicating a device in the first communication context having a suitable level of correspondence to the capability indication associated with the originating party and the session type indication.

Thereby, a destination party is aided to choose a device for use in the requested session.

This has several advantages. E.g., a destination party will get an indication of a device in the first communication context being suitable to use for engaging in the session requested by the originating party. The destination party needs not risk answering and engaging in the session using a device having very poor level of correspondence with regards to the device being used by the originating party for requesting the session and the type of session that the originating party wishes to establish with the destination party.

In an embodiment, the client is implemented in a device in the first communication context.

In yet an embodiment, the client is implemented in a node in the core network.

This provides further advantages. E.g., the method is implementable in different ways, in a network node or in devices in the communication contexts.

In an embodiment, determining capabilities of devices in the first communication context comprises retrieving the capabilities from a database located in the core network.

In still an embodiment, determining capabilities of devices in the first communication context comprises retrieving the capabilities from a database which is member of the first communication context.

In yet an embodiment, determining capabilities of devices in the first communication context comprises retrieving the capabilities by sending a request to the devices which are part of the first communication context, requesting the devices to indicate their respective capabilities.

In an embodiment, the devices in the first communication context compare their own individual capabilities to the capability indication and to the session type indication in the received request and indicates a level of correspondence there between.

In still an embodiment, the devices in the first communication context comprise a list of capabilities of other devices in the first communication context, wherein the devices compare the capability indication and the session type indication to the list of capabilities of other devices in order to determine a level of correspondence between the capability indication and the session type indication, and the capabilities of devices in the first communication context.

According to an aspect, a client in a communication network is provided, adapted to provide a communication service. The client comprises a processing unit adapted to receive a session setup request from an originating party, requesting a session with a destination party. The setup request comprises a capability indication associated with the originating party and a session type indication. The processing unit is further adapted to determine capabilities of devices in a first communication context associated with the destination party and to compare the capabilities of the devices in the first communication context to the capability indication and to the session type indication in the received request. The processing unit is yet further adapted to determine a level of correspondence between the capability indication and the session type indication, and the capabilities of devices in the first communication context. The client further comprises a providing unit adapted to provide an indication of a device in the first communication context having a suitable level of correspondence to the capability indication associated with the originating party and the session type indication.

The destination party is thereby aided in choosing a device for use in the requested session.

According to an embodiment, the client is implemented in a device in the first communication context.

According to yet an embodiment, the client is implemented in a node in the core network.

In an embodiment, the processing unit is adapted to determine the capabilities of devices in the first communication context by retrieving the capabilities from a database located within the core network.

In yet an embodiment, the processing unit is adapted to determine the capabilities of devices in the first communication context by retrieving the capabilities from a database which is a member of the first communication context.

In still an embodiment, the processing unit is adapted to determine the capabilities of devices in the first communication context by sending a request to the devices which are part of the first communication context, requesting the devices to indicate their respective capabilities.

In yet an embodiment, the processing unit is adapted to determine the capabilities of devices in the first communication context by comparing the capabilities of the device in which the client is implemented to the capability indication and to the session type indication in the received request and indicate a level of correspondence there between.

In still an embodiment, the device in which the client is implemented also comprises a list of capabilities of other devices in the first communication context and wherein the processing unit is adapted to compare the capability indication and the session type indication to the list of capabilities of other devices in order to determine a level of correspondence between the capability indication and the session type indication, and the capabilities of devices in the first communication context.

BRIEF DESCRIPTION OF DRAWINGS

The invention will now be described in more detail by means of exemplary embodiments and with reference to the accompanying drawings, in which.

DETAILED DESCRIPTION

Briefly described, method in a client in a communication network for providing communication service sand a client in a communication network adapted to provide communication services are provided.

Figure 1:
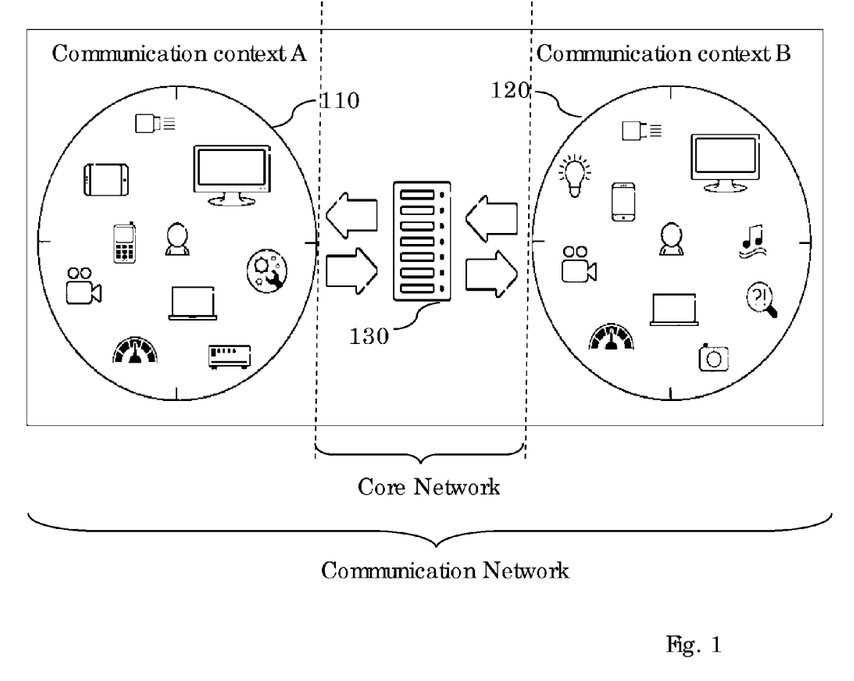
FIG. 1 is an exemplifying illustration of two parties, A and B, having a communication context A and a communication context B respectively

FIG. 1 is an illustration of two parties, A and B, having a communication context A and a communication context B respectively.

FIG. 1 illustrates a party A and a party B having a communication context A and communication context b respectively. The two communication contexts can be at their respective private homes or at their place of work or the like. Different devices can be part of the communication contexts. Just as an example, a communication context may comprise a landline phone, also called a PSTN (Public Land Telephone Network) phone, a mobile phone, a television set, a computer, a database, a DVD player, a multimedia centre and so on.

The devices in the communication context typically have different communication capabilities, i.e. the different kinds of communication they support. Just as an example, a landline telephone supports audio communication, a mobile phone also supports audio communication and optionally also video communication. A DVD player may support data communication and so on. Many devices today may in the future be capable of various kinds of communications.

In FIG. 1, a party or user is also illustrated in each communication context. In case party A wants to initiate some kind of session with party B, party A will choose one of his/her devices to use for the session he/she wishes to establish with party B. Party B will receive a notification or invitation on his/her devices in his/her communication context. It can be quite difficult for party B to select a suitable device to use for engaging in the session. The suitability of a device to use in communication context B depends on what kind of device party A is using for initiating the session and also on the kind of session party A wishes to establish with party B. Merely as an example, assume party A wishes to transfer a data file from his/her DVD player to party B, then a suitable device to use to answer and engage in the session could e.g. a computer, a database, a DVD player or a TV with a hard disk drive. An example of a device not suitable could e.g. a landline telephone or a fax machine.

Hereinafter, a communication network and a core network will be described. A core network means in this description the network or combination of networks from an access point of an originating party to an access point of a destination party. A communication network means in this description the core network plus the originating party's devices in his/her communication context and the destination party's devices in his/her communication context. This is also schematically illustrated in FIGS. 1, 9 and 10.

Figure 2:
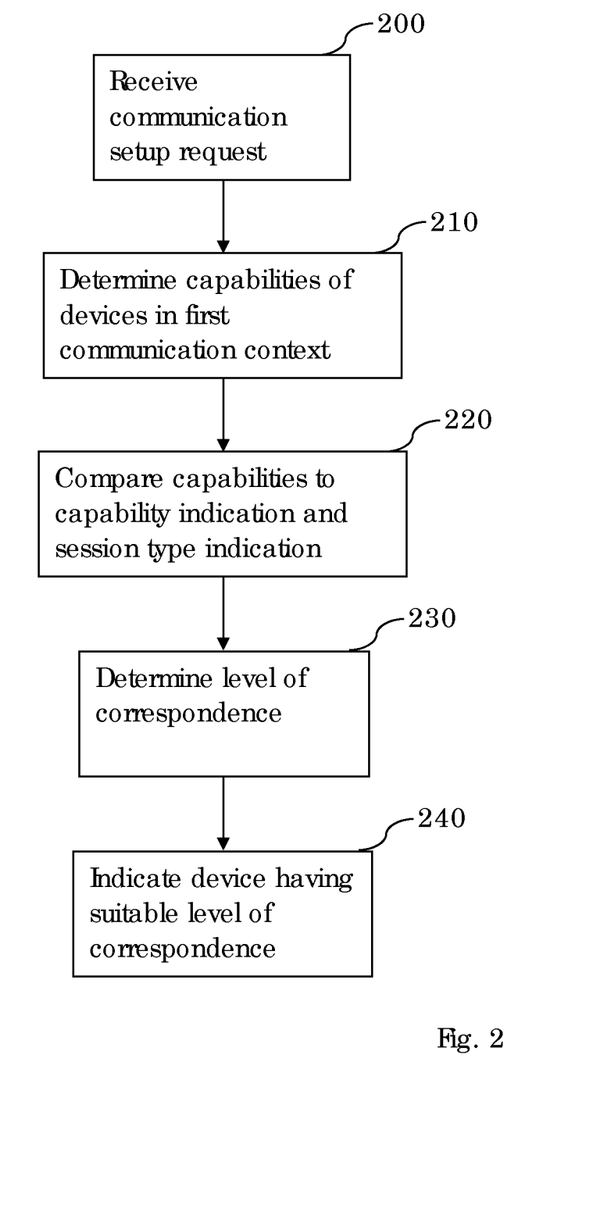
FIG. 2 is a flowchart illustrating an exemplifying embodiment of a method for providing a communication service.

An example of a method in a client in a communication network for providing communication services will now be described with reference to FIG. 2. In FIG. 2, an originating party wishes to establish some kind of session with a destination party.

FIG. 2 illustrates the in a client in a communication network, comprising a core network, for providing a communication service comprising receiving 200 a session setup request from an originating party, requesting a session with a destination party. The session setup request comprises a capability indication associated with the originating party and a session type indication. The capability indication associated with the originating party indicates the capabilities of the device in the originating communication context that is being used to initiate the session. The session type indication is an indication of what kind of session the originating party wishes to establish with the destination party.

The method further comprises determining 210 capabilities of devices in a first communication context associated with the destination party and comparing 220 the capabilities of the devices in the first communication context to the capability indication and to the session type indication in the received request.

The method further comprises determining 230 a level of correspondence between the capability indication and the session type indication, and the capabilities of devices in the first communication context.

Then method further comprises indicating 240 a device in the first communication context having a suitable level of correspondence to the capability indication associated with the originating party and the session type indication.

In this manner, the destination party is aided to choose a device for use in the requested session. It shall be observed that a device can mean one or more devices.

This can provide several advantages. A destination party will get an indication of a device in the first communication context being suitable to use for engaging in the session requested by the originating party. The destination party needs not risk answering and engaging in the session using a device having very poor level of correspondence with regards to the device being used by the originating party for requesting the session and the type of session that the originating party wishes to establish with the destination party.

Hereinafter, the level of correspondence between the capability indication and the session type indication is sometimes referred to as just the level of correspondence or the correspondence level.

Merely as an example, again assume the originating party wishes to transfer a data file from his/her DVD player to the destination party. Then a suitable device in the destination communication context to use for answering and engaging in the session could e.g. a computer, a database, a DVD player or a TV with a hard disk drive. All these devices may have at least 100% level of correspondence in case they all have at least the capabilities of the device being used by the originating party to request the session and if they fully support the type of session that the originating party wishes to establish. The devices may have other capabilities in addition to the capabilities of the device being used by the originating party to request the session, so the correspondence level may be higher than 100%. E.g. the TV comprising a hard disk drive may receive and store the file, but it also has other capabilities in addition. Therefore the level of correspondence may be 150% or 225% for example. Therefore as long as they have at least the same capabilities, the level of correspondence is at least 100%. Of course, the different devices in this example may not all have a level of correspondence of 100%. Perhaps only the DVD player in the destination communication context has e level of correspondence of 100% and the other devices in this example have from e.g. 50% to 80%. Again in this example, a fax machine may e.g. have a level of correspondence of 0%. The indication of a device having a suitable level of correspondence is in an example in the form a list, listing the devices in the communication context sorted by level of correspondence. In another example, the indication is in the form of a list but only including the devices in the communication context having a level of correspondence higher than e.g. 30%.

According to an embodiment, the client is implemented in a device in the first communication context.

In an example, the devices in the first communication context compare their own individual capabilities to the capability indication and to the session type indication in the received request and indicate a level of correspondence there between.

In this example, the client in the device will receive the session setup request which comprises a capability indication associated with the originating party and a session type indication. Then the client compares this with the capabilities of the device in which the client is implemented.

In yet an example, the devices in the first communication context comprises a list of capabilities of other devices in the first communication context, wherein, the devices compare the capability indication and the session type indication to the list of capabilities of other devices in order to determine a level of correspondence between the capability indication and the session type indication, and the capabilities of devices in the first communication context.

In this example, the devices in the first communication context have a list of the capabilities of the other devices in the first communication context. This list is in one example updated every time the communication context is changed. A change of the communication context can be the addition of a new device, removal of a device or a change of capabilities of any of the devices in the communication context.

According to yet an embodiment, the client is implemented in a node in the core network.

An example of a node in which the client is implemented, is an access node of the destination party.

In an, example, determining capabilities of devices in the first communication context comprises retrieving the capabilities by sending a request to the devices which are part of the first communication context, requesting the devices to indicate their respective capabilities.

In the example that the client is implemented in an access node of the destination party, the client may easily communicate with the devices of the first communication context associated with the destination party in order to retrieve the capabilities of the devices of the first communication context.

In an example, determining capabilities of devices in the first communication context comprises retrieving the capabilities from a database located within the core network.

In this example, the client can retrieve the capabilities of devices in the first communication context, i.e. the communication context of the destination party, from a database which is located in the core network.

In the case the client is implemented in a node in the communication network, the node accesses the database in the core network. In an example, the database is a stand-alone database in the core network. In another example, the database is incorporated into the same or into another node as the client.

In the case the client is implemented in a device in the first communication network, the client accesses the database in the core network in order to obtain the capabilities of the devices in the first communication network.

Then the client can compare the capabilities of the devices in the first communication context to the capability indication and to the session type indication in the received request, determine a level of correspondence and provide an indication of a device having a suitable level of correspondence.

In another example, determining capabilities of devices in the first communication context comprises retrieving the capabilities from a database which is a member of the first communication context.

In this example, the client can retrieve the capabilities of devices in the first communication context, i.e. the communication context of the destination party, from a database which is a member of the first communication context. Then the client can compare the capabilities of the devices in the first communication context to the capability indication and to the session type indication in the received request, determine a level of correspondence and provide an indication of a device having a suitable level of correspondence.

Figure 3:
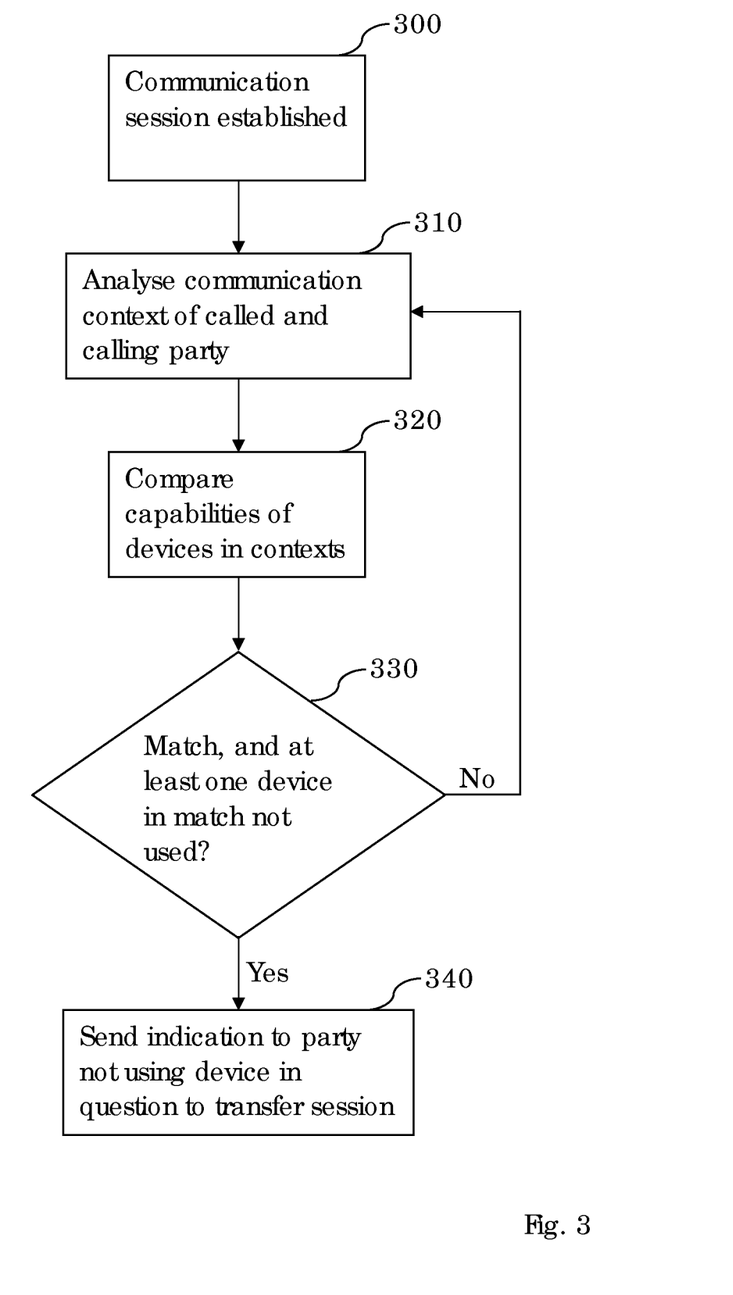
FIG. 3 is a flowchart illustrating an exemplifying embodiment of a method for providing a communication service.

Turning to FIG. 3, it is a flowchart illustrating an exemplifying embodiment of a method for providing a communication service, wherein a communication context is already established 300. In this embodiment, the client is implemented in a node in the communication network and the exemplifying method comprises analyzing 310 a second communication context associated with the originating party comprising devices having capabilities. The method further comprises comparing 320 the capabilities of the devices in the first communication context to the capabilities of the devices in the second communication context. Then, if a sufficient similarity is found, with regards to capabilities, between a device in the first communication context and a device in the second communication context, wherein at least one of the devices is not being used in the established session, an indication is sent 340 to the party or parties not using the device in question, to transfer the session to the device or devices in question.

In a case wherein e.g. the destination party used a device to engage in session having a lower level of correspondence than one or more other devices in his/her communication context, the client compares the capabilities of the devices in the first/destination and the second/originating communication context. In the example that the destination party used a device to engage in session having a lower level of correspondence than one or more other devices in his/her communication context, the client indicates to the destination party another device or devices having higher or more suitable level of correspondence with regards to the capabilities than the one being currently used by the destination party.

In another example, the destination party used a device in his/her communication context, to answer and engage in the session, having higher capabilities than the device used by the originating party to request the session. In such a case, the client compares the capabilities of the devices in the first/destination and the second/originating communication context. In this example it is assumed that the originating party has a device in his/her communication context, i.e. the second/originating communication context, having capabilities which to a greater extent corresponds to the capabilities of the device used by the destination party to answer and engage in the session. Then, as the client discovers in the comparison, at least one device in the second/originating communication context having higher capabilities than the device currently being used by the originating party in the established session, the client indicates to the originating party this device or devices In yet another example, the session is established and the client compares the capabilities of the devices in the first/destination and the second/originating communication context. The client discovers in this comparison one device in the first/destination communication context not being used in the established session and likewise one device in the second/originating communication context not being used in the established session. The two devices in this example are also assumed to have a higher or more suitable level of correspondence than the two devices currently being used in the session. Then the client indicates to both the originating party and the destination party the devices not being used. Alternatively, the devices not being used have the same level of correspondence as the devices currently being used, but they have higher capabilities than the devices currently being used.

In this way, the client constantly supervises the established session in order to enable the parties to use the devices in respective communication contexts having suitable level of correspondence.

Figure 4:
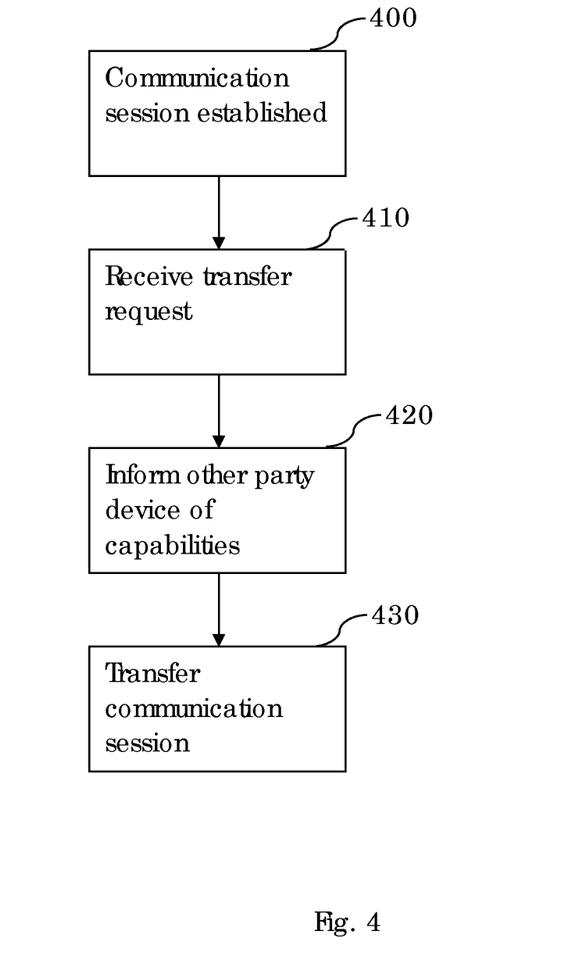
FIG. 4 is a flowchart illustrating yet an exemplifying embodiment of a method for providing a communication service.

Turning now to FIG. 4, which illustrates the situation when one of the parties in the established session wants to transfer the session to another device. In one example, this is a result of the above described example when one of the parties or both receives an indication of a device to use having more suitable level of correspondence than the device currently being used. In another example, a party decides to switch devices and hence must transfer the session.

FIG. 4 illustrates that a request is received 410 from a first party of the parties to transfer the session to another device in the communication context associated with the party requesting the transfer. The request comprises the capabilities of the device to which the session is to be transferred. Then the device of the second party is informed 420 of the capabilities of the device to which the session is to be transferred, enabling the second device to indicate the level of correspondence of this new first party device. Thereafter, the session is transferred 430 to the device as indicated in the received request.

Figure 5:
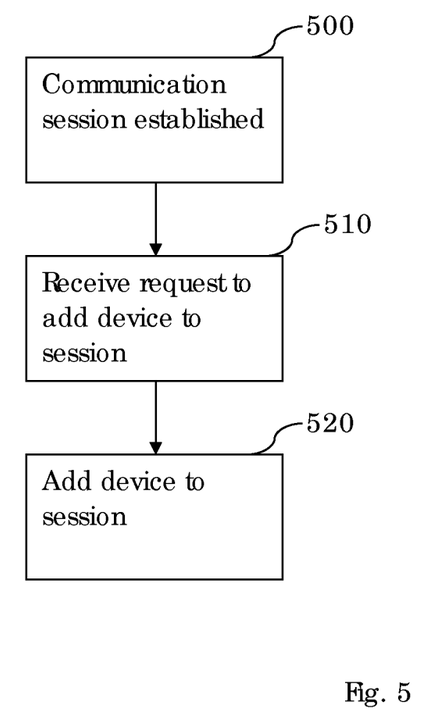
FIG. 5 is a flowchart illustrating an exemplifying embodiment of a method for providing a communication service.

FIG. 5 is a flowchart illustrating an exemplifying embodiment of a method for providing a communication service, wherein a party wants to add a device to the established session.

FIG. 5 illustrates the method comprising receiving 510 a request from one of the parties to add another device to the established session, the request comprising an indication of which device in the communication context associated with the party requesting addition, to be added, and adding 520 the other device to the already established session.

The added device has its own capabilities and these capabilities need not be the same as the capabilities of the device currently being used by the user requesting addition or the capabilities of the other party. As the device is added to the session, the capabilities of the old and the new device, i.e. the one currently being used and the added one, are in one example, added to each other.

According to an embodiment, the method further comprises, prior to receiving the session setup request from the originating party, requesting a session with the destination party; providing the originating party with information regarding the communication context of the destination party. Thereby enabling the originating party to choose a device in the second communication context having a suitable level of correspondence to at least one device in the communication context associated with the destination party with regards to capabilities.

By this exemplifying embodiment, an originating party is enabled to "see" the devices in the communication context of the destination party which the originating party whishes to request a session with. The originating party is thereby enabled to choose a device among his/her own devices in his/her communication context which has a suitable level of correspondence to a device of the destination party's communication context with regards to capabilities.

Figure 6:
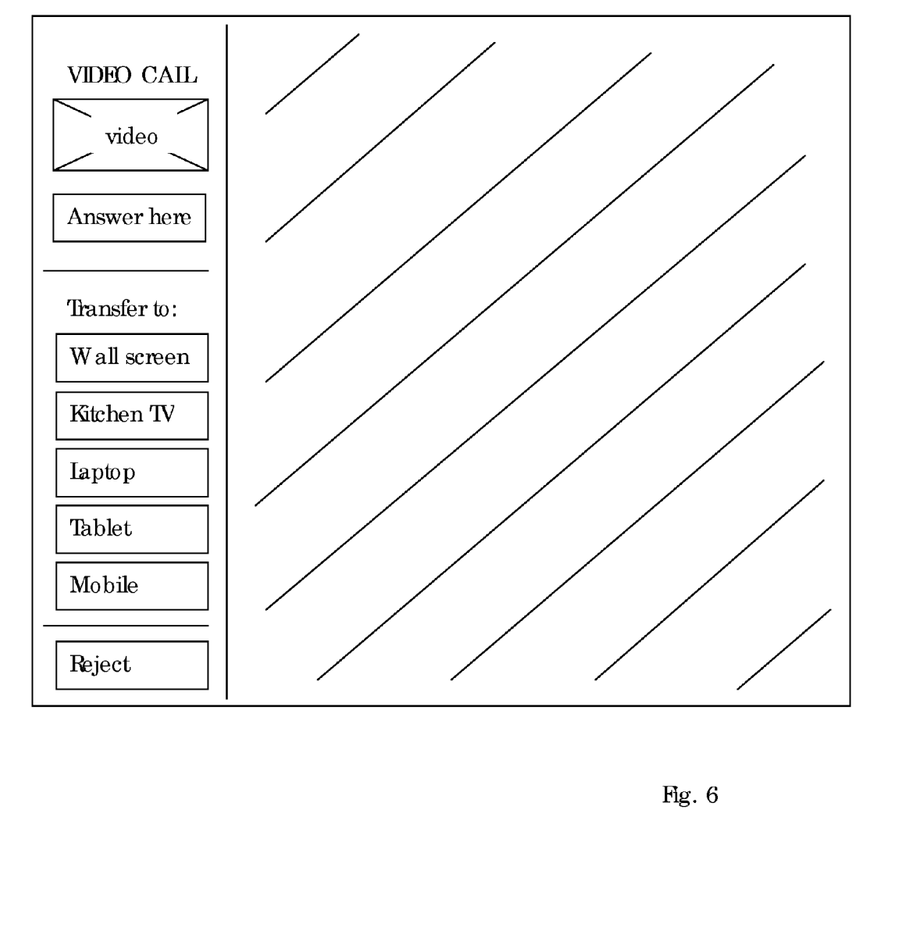
FIG. 6 is an illustration of an example of an indication on a device of an incoming session to a destination party.

FIG. 6 is an illustration of an example of an indication on a device of an incoming session to a destination party. In this example, it is assumed that the device has a display on which it can show the indication of an incoming session. In this example, it is also assumed that the communication context of the destination party comprises a plurality of devices having a variety of capabilities.

In this example, the device shows the indication of an incoming session on its screen. Further in this example, the incoming session is a video call. The device provides an option to answer the video call at the device and also provides several options of other devices to which the video call can be transferred. The list in this example is arranged such that the device with the highest level of correspondence with regards to capabilities and the type of the incoming session invitation is indicated at the top of the list of devices to which to transfer the call.

A description of a client will now be described with reference to FIGS. 7 and 8. The client comprises the same objects and advantages and hence the client is merely briefly described for simplicity reasons.

Figure 7:
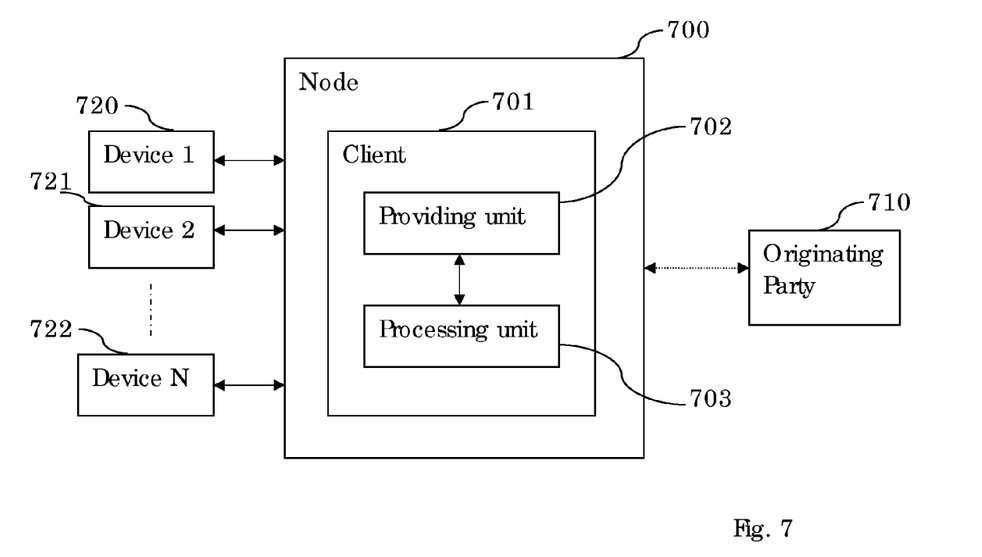
FIG. 7 is a block diagram of an exemplifying embodiment of a client when implemented in a node.

FIG. 7 is a block diagram of an exemplifying embodiment of a client when implemented in a node.

Figure 8:
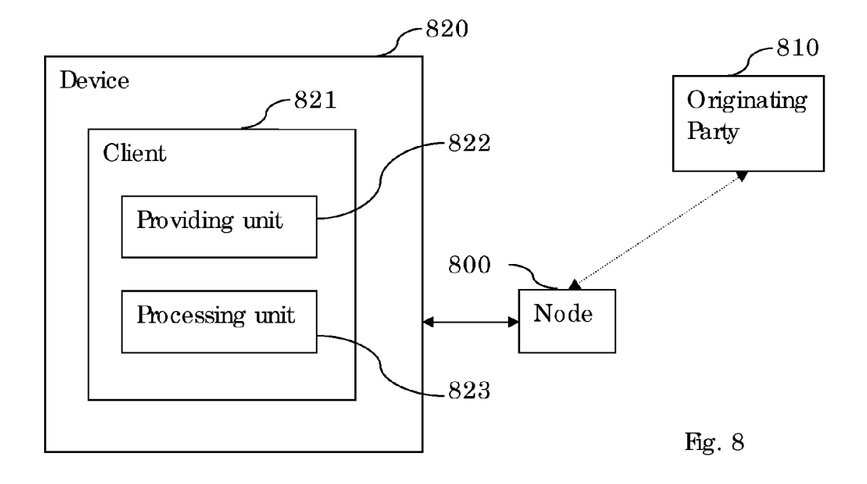
FIG. 8 is a block diagram of exemplifying embodiment of a client when implemented in a device.

FIG. 8 is a block diagram of exemplifying embodiment of a client when implemented in a device.

Both FIGS. 7 and 8 illustrates a client 701, 821 in a communication network for providing a communication service. The client comprises a processing unit 703, 823 adapted to receive a session setup request from an originating party, requesting a session with a destination party. The setup request comprises a capability indication associated with the originating party and a session type indication. The processing unit 703, 823 is further adapted to determine capabilities of devices in a first communication context associated with the destination party and to compare the capabilities of the devices in the first communication context to the capability indication and to the session type indication in the received request. The processing unit 703, 823 is yet further adapted to determine a level of correspondence between the capability indication and the session type indication, and the capabilities of devices in the first communication context. The client further comprises a providing unit 702, 822 adapted to provide an indication of a device in the first communication context having a suitable level of correspondence to the capability indication associated with the originating party and the session type indication.

The destination party is thereby aided in choosing a device for use in the requested session.

According to an exemplifying embodiment illustrated in FIG. 8, the client 821 is implemented in a device 820 in the first communication context.

In an example, the processing unit 823 is adapted to determine the capabilities of devices in the first communication context by comparing the capabilities of the device 820 in which the client is implemented to the capability indication and to the session type indication in the received request and indicate a level of correspondence there between.

In yet an example, the device 820 in which the client is implemented also comprises a list of capabilities of other devices in the first communication context. The processing unit 823 is adapted to compare the capability indication and the session type indication to the list of capabilities of other devices in order to determine a level of correspondence between the capability indication and the session type indication, and the capabilities of devices in the first communication context.

According to another exemplifying embodiment illustrated in FIG. 7, the client 701 is implemented in a node 700 in the core network.

In an example, the processing unit 703 is adapted to determine the capabilities of devices 720, 721, 722 in the communication context by sending a request to the devices which are part of the first communication context, requesting the devices to indicate their respective capabilities.

According to an embodiment, the processing unit 703, 823 is adapted to determine the capabilities of devices in the first communication context by retrieving the capabilities from a database located within the communication network.

According to yet an embodiment, the processing unit 703, 823 is adapted to determine the capabilities of devices in the first communication context by retrieving the capabilities from a database which is a member of the first communication context.

In an exemplifying embodiment, the processing unit 703 is adapted to, after a communication session has been setup, analyze a second communication context associated with the originating party comprising devices having capabilities. The processing unit 703 is further adapted to compare the capabilities of the devices in the first communication context to the capabilities of the devices in the second communication context. If a sufficient similarity is found, with regards to capabilities, between a device in the first communication context and a device in the second communication context, wherein at least one of the devices is not being used in the session, the processing unit 703 is further adapted to send an indication to the party or parties not using the device in question, to transfer the session to the device in question.

In still en exemplifying embodiment, the processing unit 703 is adapted to receive a request from a first party of the parties to transfer the session to another device in the communication context associated with the party requesting the transfer. The request comprises the capabilities of the device to which the session is to be transferred. The processing unit 703 is further adapted to inform the device of the second party of the capabilities of the device to which the session is to be transferred. Thereby, the second device is enabled to indicate the level of correspondence of this new first party device. The processing unit 702 is further adapted to transfer the session to the device as indicated in the received request.

In yet an exemplifying embodiment, the processing unit 703 is adapted to receive a request from one of the parties to add another device to the session, the request comprising an indication of which device in the communication context associated with the party requesting addition, to be added, and to add the other device to said session.

According to an embodiment, the processing unit 703, 823 is adapted to provide the originating party with information regarding the communication context of the destination party, thereby enabling the originating party to choose a device in the second communication context having a suitable level of correspondence to at least one device in the communication context associated with the destination party with regards to capabilities, prior to receiving the session setup request from the originating party, requesting a session with the destination party.

Figure 9:
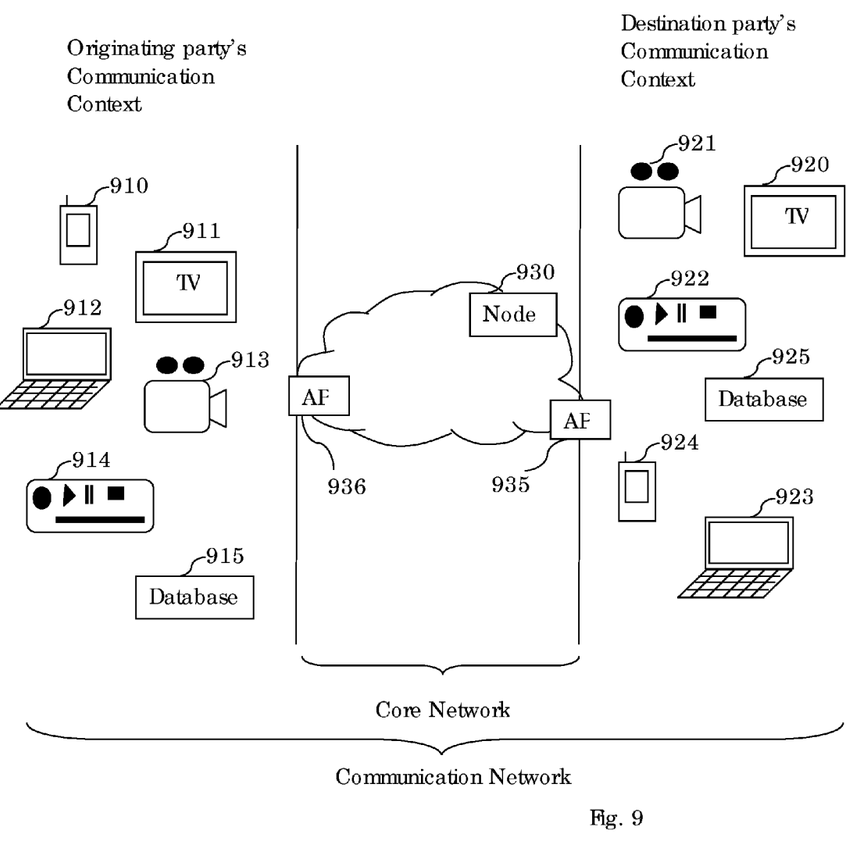
FIG. 9 is an illustration of an exemplifying embodiment of communication contexts of two parties.

FIG. 9 is an illustration of an exemplifying embodiment of communication contexts of two parties.

FIG. 9 illustrates a communication network comprising a core network and an originating party having a communication context having access to the core network via an access point 936. The communication network also comprises a destination party having a communication context having access to the core network via an access point 935.

The originating party's communication context comprises a plurality of device 910-915 and the destination party's communication context comprises devices 920-925.

As an example, assume the originating party wants to establish a session to the destination party. In this example, the originating party chooses his mobile phone 910 to establish a video call to the destination party. The originating party requests the session, i.e. the video call, by dialing a number of the destination party. In a first alternative, a client is implemented in the node 930 of the core network. The client receives a session setup request from the originating party, requesting a session with the destination party. In this example, the setup request would have a session type indication of audio and video and the capability indication of the originating device, i.e. the mobile phone 910, would likewise have a capability indication of audio and video.

The client determines the capabilities of the devices 920-925 in the destination party's communication context. The client compares the capabilities of the devices 920-925 in the destination party's communication context to both the capability indication of the originating device and the session type indication. The client determines a level of correspondence between capabilities of the devices 920-925 in the destination party's communication context and both the capability indication of the originating device and the session type indication. In this exemplifying example, the TV 920, the mobile phone 924 and the laptop 925 has the capabilities of audio and video, so for these devices, the level of correspondence, with regards to the capabilities and the session type, is 100%.

The client indicates the TV 920, the mobile phone 924 and the laptop 925 having a correspondence level of 100% and also the video camera 921 having a level of correspondence of e.g. 5% and the DVD player 922 having a level of correspondence of e.g. 35%, with regards to the capabilities and the session type. The destination party is thereby aided in choosing a suitable device for answering and engaging in the session.

In a second alternative, the client is implemented in the devices in the destination party's communication context. However, the manner in which it operates would be the same as in the first alternative.

In the example above, in the first and the second alternative, the client is in an exemplifying embodiment arranged to determine the capabilities of the devices 920-925 of the destination party's communication context by retrieving the capabilities from the database 925. In the example above, in the second alternative, when the client is implemented in the devices in the destination party's communication context, the devices 920-925 each comprises a list of the capabilities of the other devices 920-925 in the destination party's communication context. In such a case, the client is in an exemplifying embodiment arranged to determine the capabilities of the devices 920-925 of the destination party's communication context by retrieving the capabilities from the list within the device.

It shall be understood that FIG. 9 is merely an exemplifying illustration. The node 930 and the access point 935 can e.g. be incorporated into one node or entity.

Figure 10:
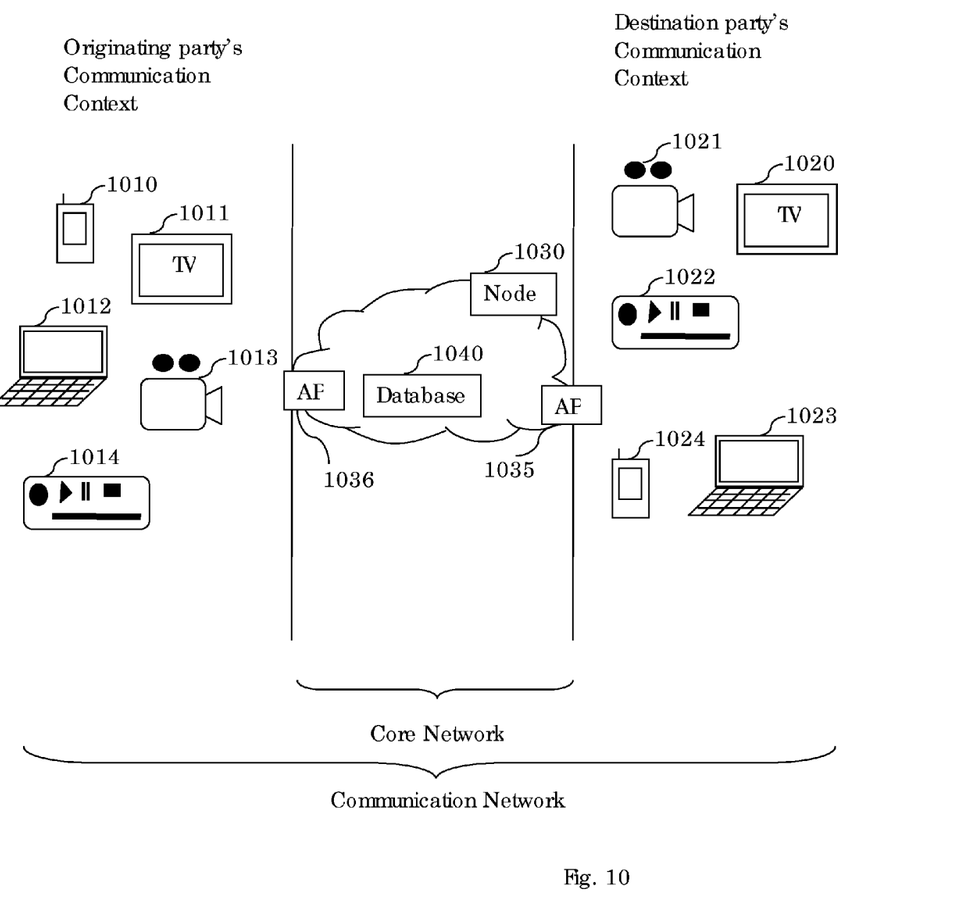
FIG. 10 is an illustration of yet an exemplifying embodiment of communication contexts of two parties.

FIG. 10 illustrates a communication network comprising a core network and an originating party having a communication context having access to the core network via an access point 1036. The communication network also comprises a destination party having a communication context having access to the core network via an access point 1035. In FIG. 10, the core network comprises a database 1040 and the two communication contexts do not comprise a database.

Referring to the example described above with reference to FIG. 9, a similar example can be performed by the exemplifying illustration in FIG. 10. The difference being that the client is in an exemplifying embodiment arranged to determine the capabilities of the devices 1020-1024 of the destination party's communication context by retrieving the capabilities from the database 1040.

It shall be understood that FIG. 10 is merely an exemplifying illustration. The node 1030 and the access point 1035 can e.g. be incorporated into one node or entity. In another example, the node 1030, the access point 1035 and that database are incorporated into one node or entity.

With reference to FIGS. 7 and 8 the functional unit 702, 703, 822, 823 described above can be implemented in the client 701, 821 as program modules of a computer program comprising code means which when run by a processor in the client 701, 821 causes the client 701, 821 to perform the above-described functions and actions. The processor may be a single CPU (Central processing unit), or could comprise two or more processing unit in the client 701, 821. For example, the processor may include general purpose microprocessors, instruction set processors and/or related chips sets and/or special purpose microprocessors such as ASICs (Application Specific Integrated Circuit). The processor may also comprise board memory for caching purposes.

The computer program may be carried by a computer program product CPP in the client 701, 821 connected to the processor. The computer program product comprises a computer readable medium on which the computer program is stored. For example, the computer program product may be a flash memory, a RAM (Random-access memory), a ROM (Read-Only Memory) or an EEPROM (Electrically Erasable Programmable ROM), and the program modules could in alternative embodiments be distributed on different computer program product in the form of memories within the client 701, 821.

It should be noted that FIGS. 7 and 8 merely illustrates various functional unit in the client 701, 821 in a logical sense. However, these functions can be implemented in practice using any suitable software and hardware means. Thus, the invention is generally not limited to the shown structures of the client 701, 821 and the functional units.

While the invention has been described with reference to specific exemplary embodiments, the description is generally only intended to illustrate the inventive concept and should not be taken as limiting the scope of the invention. The present invention is defined by the appended claims.

The invention claimed is:

1. A method in a client apparatus in a communication network that comprises a core network for providing a communication service, the method comprising:
   receiving a session setup request from an originating party, the session setup request requesting a session with a destination party and comprising a capability indication associated with said originating party and a session type indication;
   determining capabilities of devices in a first communication context associated with said destination party;
   comparing said capabilities of the devices in said first communication context to said capability indication and to said session type indication in said received request;
   determining a level of correspondence between said capability indication and said session type indication and said capabilities of devices in said first communication context;
   indicating a device in said first communication context having a suitable level of correspondence to said capability indication associated with said originating party and said session type indication, thereby aiding the destination party to choose a device for use in the requested session to establish a communication session with the originating party, wherein
   after the communication session has been established, the method further comprises:
   determining that the device chosen by the destination party has capabilities higher than that of a device used by the originating party to request the session setup;
   identifying a device, in a second communication context associated with said originating party, having higher capabilities than the device currently being used by the originating party in the established session; and
   indicating said identified device to the originating party to be used for the established session.

2. The method of claim 1, wherein said client apparatus is one of the devices in said first communication context.

3. The method of claim 2, wherein the devices in said first communication context compare their own individual capabilities to said capability indication and to said session type indication in said received request, and indicate a level of correspondence therebetween.

4. The method of claim 2, wherein the devices in said first communication context comprise a list of capabilities of other devices in said first communication context, wherein the devices compare said capability indication and said session type indication to said list of capabilities of other devices in order to determine a level of correspondence between said capability indication and said session type indication and said capabilities of devices in said first communication context.

5. The method of claim 1, wherein said client apparatus is a node in said core network.

6. The method of claim 5, wherein said determining capabilities of devices in said first communication context comprises retrieving said capabilities by sending a request to the devices that are part of said first communication context, requesting the devices to indicate their respective capabilities.

7. The method of claim 5, further comprising:
   receiving a request from a first party of said parties to transfer said session to another device in the communication context associated with the party requesting the transfer, said request comprising the capabilities of the device to which the session is to be transferred;
   informing the device of the second party of the capabilities of the device to which the session is to be transferred, enabling the second device to indicate the level of correspondence of this new first party device; and
   transferring said session to the device as indicated in said received request.

8. The method of claim 1, wherein said determining capabilities of devices in said first communication context comprises retrieving said capabilities from a database located in said core network.

9. The method of claim 1, wherein said determining capabilities of devices in said first communication context comprises retrieving said capabilities from a database that is a member of said first communication context.

10. The method of claim 1, further comprising, after the communication session has been set up:
    analyzing the second communication context associated with said originating party comprising devices having capabilities;
    comparing said capabilities of the devices in said first communication context to said capabilities of the devices in said second communication context; and,
    if a sufficient similarity is found, with regards to capabilities, between a device in said first communication context and a device in said second communication context, wherein at least one of the devices is not being used in said session, sending an indication to the party or parties not using the device in question, to transfer the session to said device in question.

11. The method of claim 1, further comprising, prior to receiving said session setup request from said originating party, providing said originating party with information regarding the communication context of said destination party, thereby enabling said originating party to choose a device in a second communication context having a suitable level of correspondence to at least one device in the communication context associated with said destination party with regards to capabilities.

12. The method of claim 1, wherein said device in the second communication context is identified by comparing the capabilities of devices in the first communication context to capabilities of devices in the second communication context.

13. A client apparatus adapted for use in a communication network that comprises a core network adapted to provide a communication service, said client apparatus comprising:
    a processing unit adapted to
      receive a session setup request from an originating party, the session setup request requesting a session with a destination party and comprising a capability indication associated with said originating party and a session type indication,
      determine capabilities of devices in a first communication context associated with said destination party,
      compare said capabilities of the devices in said first communication context to said capability indication and to said session type indication in said received request, and
      determine a level of correspondence between said capability indication and said session type indication, and said capabilities of devices in said first communication context;
    a providing unit adapted to provide an indication of a device in said first communication context having a suitable level of correspondence to said capability indication associated with said originating party and said session type indication, thereby aiding the destination party to choose a device for use in the requested session to establish a communication session with the originating party, wherein after the communication session has been established, the processing unit is further adapted to:

determine that the device chosen by the destination party has capabilities higher than that of a device used by the originating party to request the session setup;

identify a device, in a second communication context associated with said originating party, having higher capabilities than the device currently being used by the originating party in the established session; and indicate said identified device to the originating party to be used for the established session.

14. The client apparatus of claim 13, wherein said client apparatus is implemented in a device in said first communication context.

15. The client apparatus of claim 14, wherein said processing unit is adapted to determine said capabilities of devices in said first communication context by comparing the capabilities of the device in which the client apparatus is implemented to said capability indication and to said session type indication in said received request and indicating a level of correspondence therebetween.

16. The client apparatus of claim 14, wherein said device in which said client apparatus is implemented also comprises a list of capabilities of other devices in said first communication context, and wherein said processing unit is adapted to compare said capability indication and said session type indication to said list of capabilities of other devices in order to determine a level of correspondence between said capability indication and said session type indication and said capabilities of devices in said first communication context.

17. The client apparatus of claim 13, wherein said client apparatus is implemented in a node in said core network.

18. The client apparatus of claim 17, wherein said processing unit is adapted to determine said capabilities of devices in said first communication context by sending a request to the devices that are part of said first communication context, requesting the devices to indicate their respective capabilities.

19. The client apparatus of claim 17, wherein said processing unit is adapted to:

receive a request from a first party of said parties to transfer said session to another device in the communication context associated with the party requesting the transfer, said request comprising the capabilities of the device to which the session is to be transferred;

inform the device of the second party of the capabilities of the device to which the session is to be transferred, enabling the second device to indicate the level of correspondence of this new first party device; and transfer said session to the device as indicated in said received request.

20. The client apparatus of claim 13, wherein said processing unit is adapted to determine said capabilities of devices in said first communication context by retrieving said capabilities from a database located within said core network.

21. The client apparatus of claim 13, wherein said processing unit is adapted to determine said capabilities of devices in said first communication context by retrieving said capabilities from a database which is a member of said first communication context.

22. The client apparatus of claim 13, wherein said processing unit is adapted to, after the communication session has been set up:

analyze the second communication context associated with said originating party comprising devices having capabilities;

compare said capabilities of the devices in said first communication context to said capabilities of the devices in said second communication context; and if a sufficient similarity is found, with regards to capabilities, between a device in said first communication context and a device in said second communication context, wherein at least one of the devices in said sufficient similarity is not being used in said session, send an indication to the party or parties not using the device in question, to transfer the session to said device in question.

23. The client apparatus of claim 13, wherein said processing unit is adapted to provide said originating party with information regarding the communication context of said destination party, prior to receiving said session setup request from said originating party, thereby enabling said originating party to choose a device in a second communication context having a suitable level of correspondence to at least one device in the communication context associated with said destination party with regards to capabilities.

* * * * *